US012630152B2

(12) United States Patent
Choi et al.

(10) Patent No.: US 12,630,152 B2
(45) Date of Patent: May 19, 2026

(54) METHOD AND APPARATUS FOR CONTROLLING VEHICLE BASED ON UWB

(71) Applicants: Hyundai Motor Company, Seoul (KR); Kia Corporation, Seoul (KR)

(72) Inventors: Jung Hun Choi, Hwaseong-si (KR); Dong Hyun Ha, Seoul (KR); Jae Wung Jung, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 222 days.

(21) Appl. No.: 18/102,898

(22) Filed: Jan. 30, 2023

(65) Prior Publication Data

US 2023/0331218 A1 Oct. 19, 2023

(30) Foreign Application Priority Data

Apr. 18, 2022 (KR) ........................ 10-2022-0047683

(51) Int. Cl.
| | |
|---|---|
| *B60W 30/09* | (2012.01) |
| *B60W 10/04* | (2006.01) |
| *B60W 10/18* | (2012.01) |
| *B60W 10/20* | (2006.01) |
| *B60W 10/22* | (2006.01) |
| *B60W 50/14* | (2020.01) |
| *H04B 1/69* | (2011.01) |

(52) U.S. Cl.
CPC ............ *B60W 30/09* (2013.01); *B60W 10/04* (2013.01); *B60W 10/18* (2013.01); *B60W 10/20* (2013.01); *B60W 10/22* (2013.01); *B60W 50/14* (2013.01); *H04B 1/69* (2013.01);
*B60W 2050/146* (2013.01); *B60W 2420/403* (2013.01); *B60W 2554/404* (2020.02); *B60W 2554/802* (2020.02); *B60W 2556/45* (2020.02); *B60W 2710/18* (2013.01); *B60W 2710/20* (2013.01); *B60W 2710/22* (2013.01)

(58) Field of Classification Search
None
See application file for complete search history.

(56) References Cited

U.S. PATENT DOCUMENTS

| | | | | |
|---|---|---|---|---|
| 2016/0082978 | A1* | 3/2016 | Ozaki .................... | G01C 21/34 |
| | | | | 701/58 |
| 2019/0287394 | A1* | 9/2019 | Aoude ............. | G08G 1/096716 |
| 2019/0344784 | A1* | 11/2019 | You ........................ | B60W 10/20 |
| 2020/0206921 | A1* | 7/2020 | Xiong ................... | B25J 9/1664 |
| 2021/0107477 | A1* | 4/2021 | Kim ....................... | B60W 40/02 |
| 2022/0024007 | A1* | 1/2022 | Karlsson ............... | B25B 23/147 |
| 2022/0108613 | A1* | 4/2022 | Estep .................. | G07C 5/0825 |
| 2022/0286809 | A1* | 9/2022 | Hasegawa ............. | H04W 76/15 |
| 2022/0292973 | A1* | 9/2022 | Orlando ................ | B66F 9/0755 |

* cited by examiner

*Primary Examiner* — James J Lee
*Assistant Examiner* — Jonathan E Reinert
(74) *Attorney, Agent, or Firm* — Morgan, Lewis & Bockius LLP

(57) ABSTRACT

A method and apparatus of controlling a vehicle based on UWB includes receiving from at least one UWB tag, tag data which is data about a target object carrying the UWB tag; positioning for extracting dynamic information of the UWB tag using location information of a subject vehicle and the tag data; determining a collision risk of the subject vehicle with the target object based on the extracted dynamic information; and controlling, at least one electronic control unit (ECU) included in the subject vehicle depending on the collision risk.

15 Claims, 10 Drawing Sheets

_S804_

METHOD AND APPARATUS FOR CONTROLLING VEHICLE BASED ON UWB

CROSS-REFERENCE TO RELATED APPLICATIONS

The present application claims priority to Korean Patent Application No. 10-2022-0047683, filed on Apr. 18, 2022, the entire contents of which is incorporated herein for all purposes by this reference.

BACKGROUND OF THE PRESENT DISCLOSURE

Field of the Present Disclosure

The present disclosure relates to a vehicle control method and apparatus based on ultra-wideband (UWB).

Description of Related Art

The contents described in the present section merely provide background information related to the present disclosure and do not form the related art.

Technology related to a sensor for preventing an accident of a vehicle is developing. A sensor fusion system, which includes a camera, light detection and ranging (LiDAR), and radio detection and ranging (Radar) detects an object around a vehicle. To detect an object, the sensor fusion system is pre-trained using massive learning data. An electronic control unit (ECU) included in the vehicle provides a warning notification to a driver when it is determined that there is a risk of collision between the vehicle and the detected object. Alternatively, the ECU may directly avoid a collision by controlling an engine control unit, a suspension system, a steering system, or a braking system of the vehicle.

However, the conventional sensor has a problem in that the recognition rate is lowered due to weather conditions or lens contamination. Furthermore, the conventional sensor has a problem in that it cannot recognize an object behind an obstacle or an object existing in a blind spot. Due to the provided configuration, a collision may occur between a vehicle and an object suddenly appearing in front of the vehicle. The driver reduces the driving speed of the vehicle to prevent a collision between the vehicle and an object which may appear from behind the obstacle. Accordingly, the conventional accident prevention technology causes urban road congestion and does not secure sufficient safety of the vehicle.

An ultra-wideband (UWB) wireless communication technology is a technology for transmitting and receiving data using a signal having a low power spectrum density. The signal used in the UWB method has a bandwidth of GHz band, and in comparison with Bluetooth which is a short-range wireless communication technology, UWB communication technology makes high-speed broadband communication possible. Conventionally, there is a technology for determining the location of a vehicle based on Global Positioning System (GPS) and UWB. The conventional positioning technology assists the driving of a vehicle by use of UWB communication in an environment, such as a tunnel, where it is difficult to receive Global Positioning System (GPS) information. However, the conventional positioning technology has a limitation in that it detects a dangerous object using UWB communication but does not secure driving safety of the vehicle based on the detected object information.

Accordingly, there is a demand for a technology for preventing a collision between a vehicle and an object by detecting an object behind an obstacle based on ultra-wideband communication.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and apparatus for controlling a vehicle based on object information detected using UWB communication.

According to an exemplary embodiment of the present disclosure, a method of controlling a vehicle based on ultra-wideband (UWB) performed by a vehicle control apparatus is provided, the method including: receiving by a communication unit, from at least one UWB tag, tag data which is data about a target object carrying the at least one UWB tag; positioning, by a positioning unit, for extracting dynamic information of the at least one UWB tag using location information of a subject vehicle and the tag data; determining, by a calculator, a collision risk of the subject vehicle with the target object based on the extracted dynamic information; and controlling, by a controller, at least one electronic control unit (ECU) included in the subject vehicle depending on the collision risk.

According to another exemplary embodiment of the present disclosure, an apparatus for controlling a vehicle based on ultra-wideband (UWB) is provided, the apparatus including: a communication unit configured to receive, from at least one UWB tag, tag data which is data about a target object carrying the at least one UWB tag; a positioning unit configured to extract dynamic information of the at least one UWB tag using location information of a subject vehicle and the tag data; a calculator configured to determine a collision risk of the subject vehicle with the target object based on the extracted dynamic information; and a controller configured to control at least one electronic control unit (ECU) included in the subject vehicle depending on the collision risk.

According to various exemplary embodiments of the present disclosure, a computer program stored in a computer-readable recording medium to execute each process included in the method for controlling a vehicle is provided.

According to an exemplary embodiment of the present disclosure, it is possible to prevent a collision between the vehicle and an object suddenly appearing from a blind spot.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
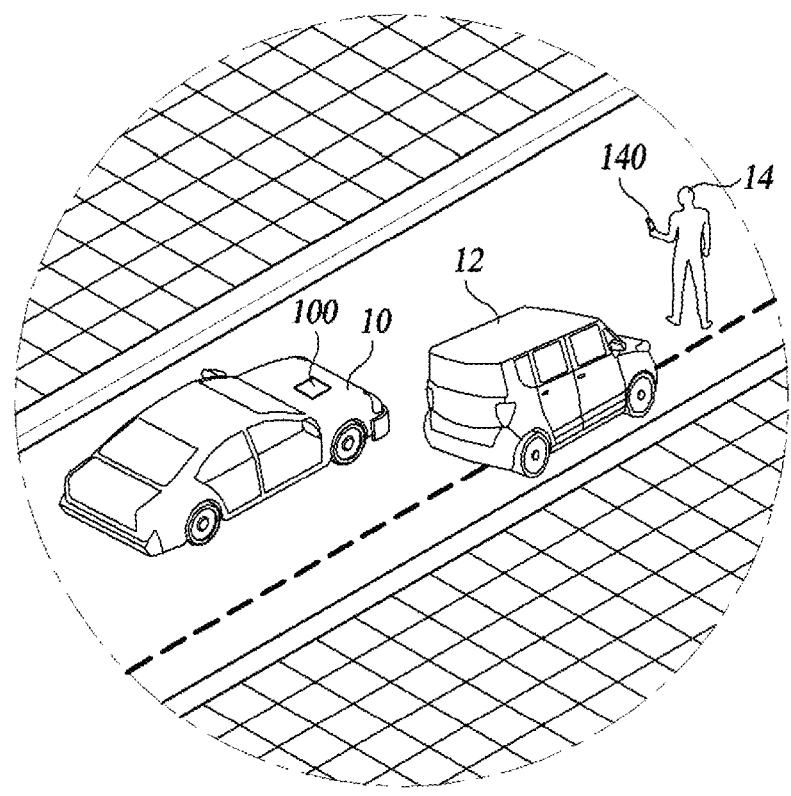
FIG. 1 is a conceptual diagram illustrating a scenario in which a vehicle control apparatus according to an exemplary embodiment of the present disclosure operates.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, some exemplary embodiments of the present disclosure will be described in detail with reference to the accompanying drawings. In the following description, like reference numerals designate like elements, although the elements are shown in different drawings. Furthermore, in the following description of various exemplary embodiments of the present disclosure, a detailed description of known functions and configurations incorporated therein will be omitted for clarity and for brevity.

Additionally, various terms such as first, second, A, B, (a), (b), etc., are used solely to differentiate one component from the other but not to imply or suggest the substances, order, or sequence of the components. Throughout the present specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is directed to describe exemplary embodiments of the present disclosure, and is not intended to represent the only embodiments in which an exemplary embodiment of the present disclosure may be practiced.

FIG. 1 is a conceptual diagram illustrating a scenario in which a vehicle control apparatus according to an exemplary embodiment of the present disclosure operates.

A vehicle control system according to an exemplary embodiment of the present disclosure includes a vehicle control apparatus 100 and an Ultra-Wide Band (UWB) tag 140. The vehicle control apparatus 100 recognizes in advance an object 14 hidden by an obstacle based on communication with the UWB tag 140. The vehicle control apparatus 100 may determine a risk of collision with the object 14, and may control driving of a vehicle or provide a warning notification to a driver to avoid collision with the object 14.

The vehicle control apparatus 100 is disposed in a vehicle 10. In an exemplary embodiment of the present disclosure, the vehicle 10 includes an autonomous vehicle (AV), a driverless vehicle, and a manned vehicle. In other words, in an exemplary embodiment of the present disclosure, the vehicle 10 including the vehicle control apparatus 100 is not limited to an autonomous vehicle. Furthermore, in an exemplary embodiment of the present disclosure, the vehicle 10 may refer to a subject vehicle, which is a subject to the control of the vehicle control apparatus 100, unless referred to as another vehicle or other vehicles. A specific location of the vehicle control apparatus 100 provided in the vehicle 10 is not limited to the exemplary embodiment of the present disclosure. The vehicle control apparatus 100 communicates with the UWB tag 140. The vehicle control apparatus 100 determines the position of the object 14 based on the signal received from the UWB tag 140. The vehicle control apparatus 100 may recognize in advance the position of the object 14 hidden by the obstacle 12. The vehicle control apparatus 100 tracks the position of the object 14 in real time. The vehicle control apparatus 100 determines the risk of collision with the object 14 based on the position of the object 14. The vehicle control apparatus 100 is configured to control at least one electronic control unit (ECU) included in the vehicle 10 depending on the determined collision risk.

The UWB tag 140 is a device that performs UWB communication with the vehicle control apparatus 100. The UWB tag 140 may be portable equipment carried by the object 14. The UWB tag 140 may include a communication unit and a sensor unit. The communication unit may support ultra-wideband (UWB), which is a wireless communication protocol. The sensor unit may be implemented as an inertia measurement unit (IMU) including an accelerometer and a gyroscope. In an exemplary embodiment of the present disclosure, a pedestrian is shown as the object 14 carrying the UWB tag 140. However, the UWB tag 140 may be a device attached to various objects such as other vehicles, bicycles, and strollers. That is, the vehicle control apparatus 100 may prevent in advance an accident with personal mobility, people with limited mobility, or another vehicle entering a driving lane from a blind spot. The UWB tag 140 may be a device inserted into user equipment (UE) such as a smartphone. Accordingly, the object recognized by the vehicle control apparatus 100 based on UWB communication is not limited to the exemplary embodiment of the present disclosure.

Figure 2:
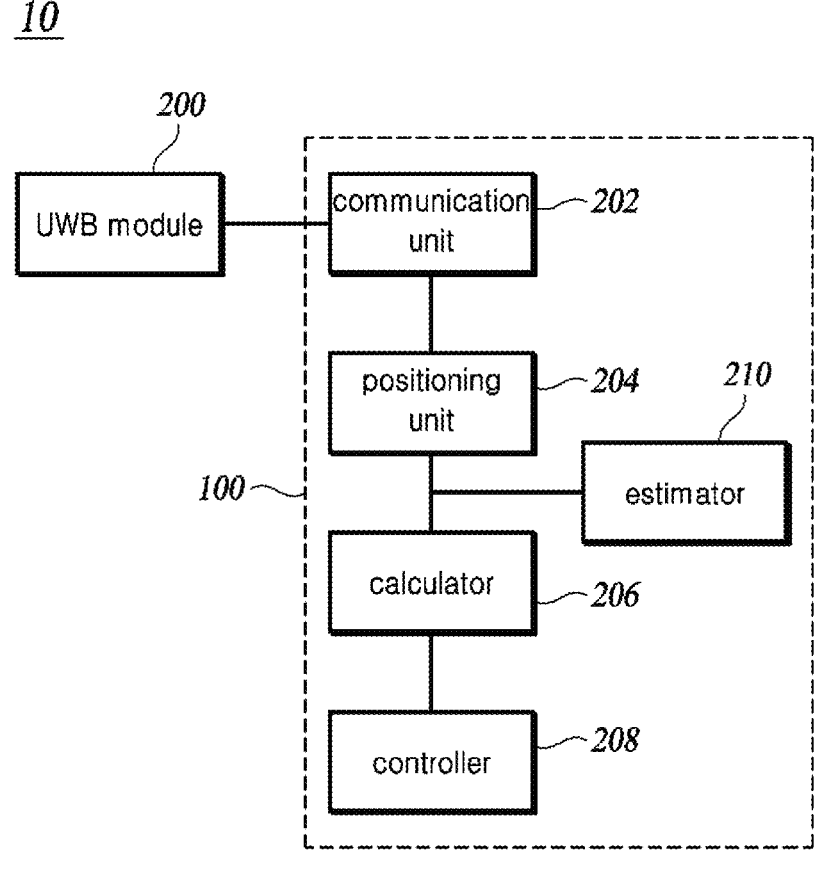
FIG. 2 is a block diagram for explaining each configuration included in the vehicle control apparatus according to an exemplary embodiment of the present disclosure.

FIG. 2 is a block diagram for explaining each configuration included in the vehicle control apparatus according to an exemplary embodiment of the present disclosure.

The vehicle control apparatus 100 according to an exemplary embodiment of the present disclosure includes all or some of a communication unit 202, a positioning unit 204, a calculator 206, a controller 208, and an estimator 210. The vehicle control apparatus 100 shown in FIG. 2 is an example according to an exemplary embodiment of the present disclosure, and all blocks shown in FIG. 2 are not essential components, and in another exemplary embodiment of the present disclosure, some blocks included in the vehicle control apparatus 100 may be added, changed or deleted. For example, the vehicle control apparatus 100 may further include a pre-processor that generates an input dataset including tag information and sensor information of the subject vehicle. The estimator 210 inputs the input dataset generated by the pre-processor into a pre-trained collision risk estimation model and estimates a risk of collision between the vehicle 10 and the object 14 to provide basic information for avoidance. Meanwhile, the vehicle control apparatus 100 may determine the risk of collision between the vehicle 10 and the object 14 based on dynamic information extracted by the positioning unit 204 without the pre-processor and the estimator 210.

Hereinafter, each configuration included in the vehicle control apparatus 100 will be described with reference to FIG. 2.

The communication unit 202 receives, from at least one UWB tag, tag data which is data about a target object carrying the UWB tag. The tag data may include an object label indicating the type of the object 14 carrying the UWB tag and a UWB data packet. The communication unit 202 may communicate with the UWB module 200 using an in-vehicle network such as a controller area network (CAN) protocol, but the specific network structure used by the communication unit 202 is not limited thereto. The UWB module 200 is a device included in the vehicle 10 and transmits tag data related to the UWB tag 140 to the communication unit 202. In FIG. 2, the UWB module 200 is illustrated as being located outside the vehicle control apparatus 100, but in another exemplary embodiment of the present disclosure, the UWB module 200 may operate as a part of the vehicle control apparatus 100. Meanwhile, based on UWB communication, the vehicle control apparatus 100 supports autonomous driving based on sensor fusion. Accordingly, the vehicle control apparatus 100 can detect the object 14 without a communication network infrastructure such as a cellular mobile communication network service and assist autonomous driving.

Figure 3:
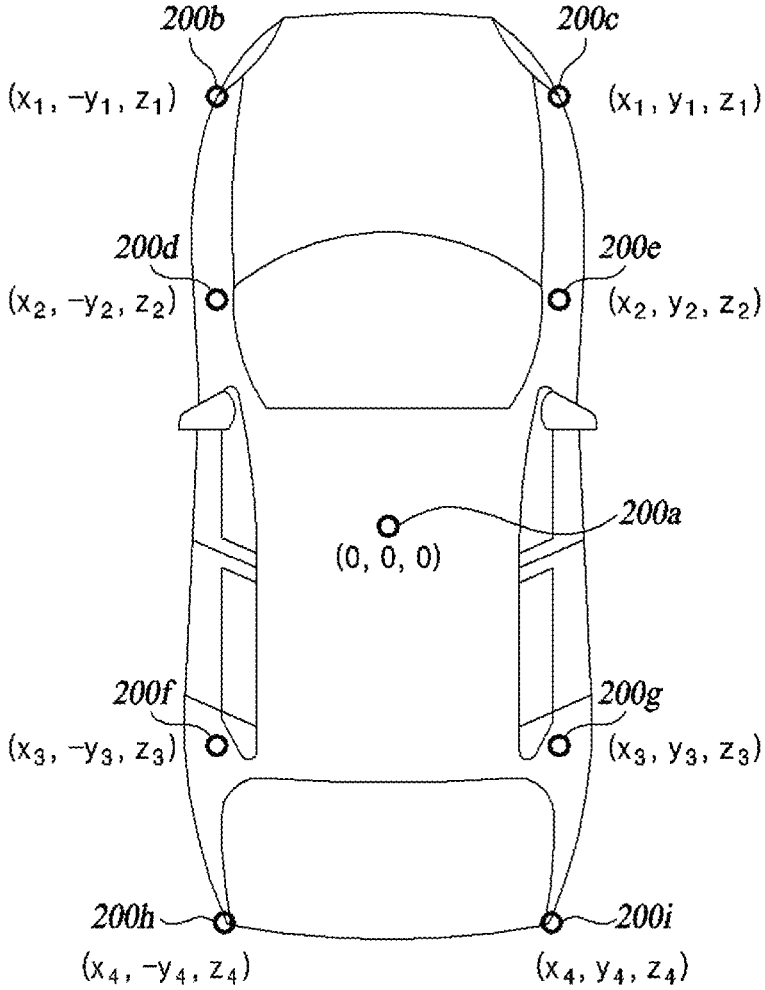
FIG. 3 is an exemplary diagram for explaining a UWB module included in a vehicle according to an exemplary embodiment of the present disclosure.

FIG. 3 is an exemplary diagram for explaining the UWB module included in a vehicle according to an exemplary embodiment of the present disclosure.

Referring to FIG. 3, an example is shown in which a plurality of UWB modules 200 (200a to 200i) are disposed at the vehicle 10 and each includes unique coordinates based on the UWB module 200a located at the center portion of the vehicle. For example, absolute coordinates of the UWB module 200a located at the center portion of the vehicle may be measured using Global Positioning Satellite (GPS) coordinates. The positioning unit 204 may set the UWB module 200a located at the center portion of the vehicle as an origin, and set each relative coordinates of the other UWB modules (200b to 200i) based on the origin. To recognize accurate 3D coordinates of the UWB tag 140, a plurality of UWB modules 200 are required as anchor nodes. Accordingly, some UWB modules 200 among the nine UWB modules 200 shown in FIG. 3 transmit and receive signals to or from the UWB tag 140, and position the UWB tag 140. Meanwhile, FIG. 3 is for expressing the relative positions between the UWB modules 200, and the specific number and positions of the UWB modules 200 disposed at the vehicle 10 are not limited to the exemplary embodiment of the present disclosure.

The positioning unit 204 extracts dynamic information of the UWB tag by use of the location information for the subject vehicle 10 and tag data. The positioning method used by the positioning unit 204 may be two-way ranging (TWR), multidimensional scaling (MDS), or distributed weighted MDS (dw-MDS). The MDS is a technique for analyzing the similarity between data in which a size is assigned to each item, and is a technique for intuitively grasping correlation between entities. MDS is a type of cooperative positioning technique and has advantageous properties for performing simultaneous positioning for a plurality of nodes. The dw-MDS is a modified MDS technique to reduce the amount of computation. In an exemplary embodiment of the present disclosure, it is described that the positioning unit 204 determines the real-time location of the UWB tag 140 carried by the remote object 14 based on the dw-MDS. However, the positioning method used by the positioning unit 204 is not limited to the present disclosure.

Figure 4:
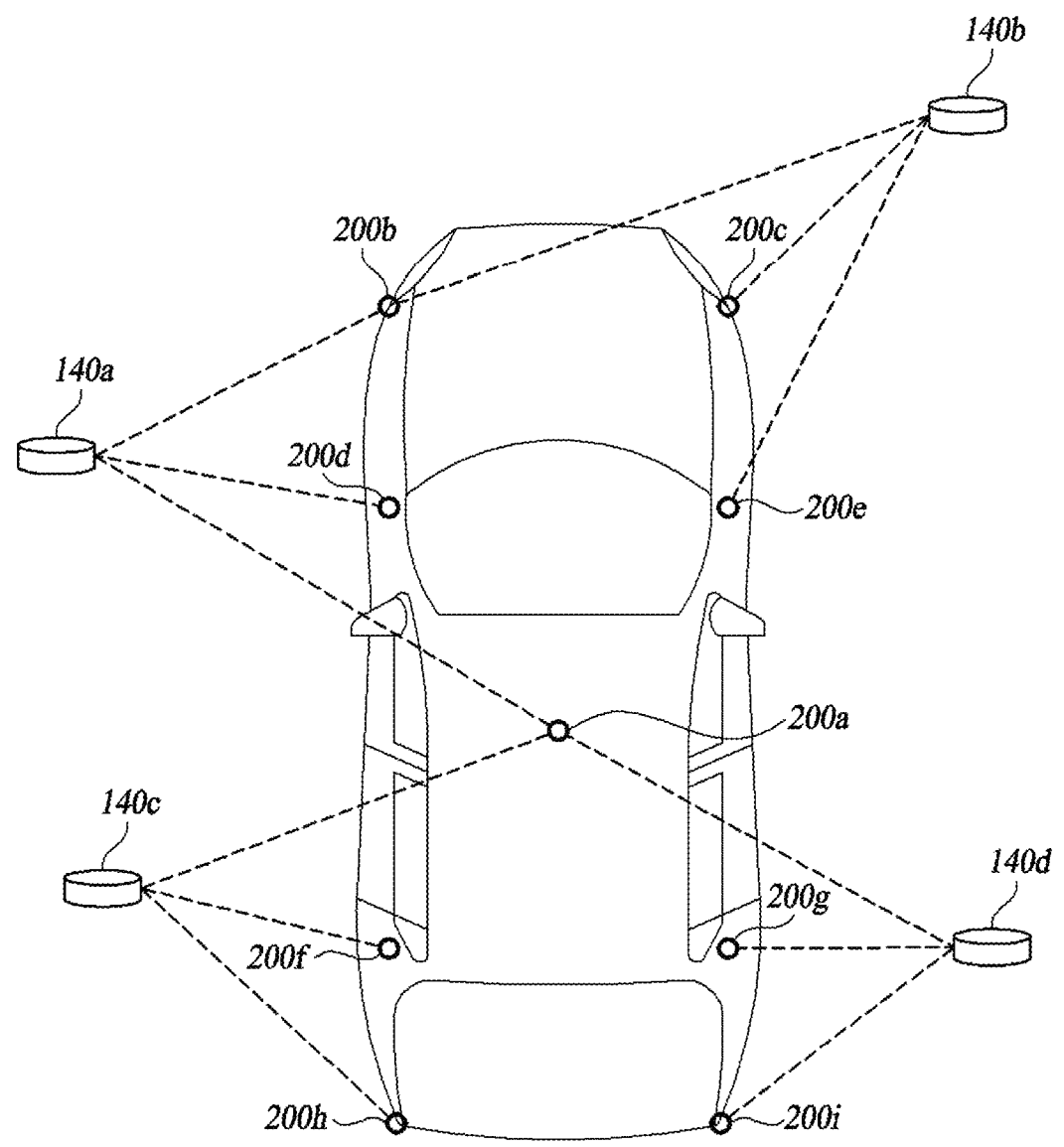
FIG. 4 is an exemplary view for explaining positioning performed by the vehicle control apparatus according to an exemplary embodiment of the present disclosure.

FIG. 4 is an exemplary view for explaining positioning performed by the vehicle control apparatus according to an exemplary embodiment of the present disclosure.

Referring to FIG. 4, a plurality of UWB modules 200 operating as anchor nodes are shown. Some UWB modules 200 transmit and receive signals to or from the UWB tag 140 to extract dynamic information of the UWB tag 140. For example, the dynamic information includes three-dimensional (3D) position, velocity, and estimated acceleration of the object 14 carrying the UWB tag 140. In FIG. 4, communication between each of UWB tags 140 positioned around the vehicle 10 and adjacent UWB modules 200 is illustrated. However, among the plurality of UWB modules 200 disposed at the vehicle 10, the UWB modules 200 that transmit and receive information to or from the UWB tags 140 around the vehicle 10 may be changed according to various exemplary embodiments of the present disclosure. The positioning unit 204 searches for a shortest path between each pair of nodes on a data structure including the recognized UWB tags and the plurality of UWB modules 200 of the vehicle 10 as nodes. For example, the positioning unit 204 may generate a data structure having the UWB tag 140a located at the front left and the adjacent UWB modules 200b, 200c, and 200d as nodes. The positioning unit 204 determine the shortest path between nodes for each the node pairs (140a, 200b), (140a, 200c), (140a, 200d), (200b, 200c), (200c, 200d) and (200d, 200b). Here, the method of determining the shortest path between nodes included in the data structure, such as Dijkstra's algorithm or Floyd's algorithm, is common in the art, and a detailed description thereof will be omitted. The positioning unit 204 determines a weight for the distance between nodes corresponding to the determined shortest path. For example, the positioning unit 204 determines weights $w_{ab}$, $w_{ac}$, $w_{ad}$, $w_{bc}$, $w_{bd}$, and $w_{cd}$ respectively corresponding to $d_{ab}$, $d_{ac}$, $d_{ad}$, $d_{bc}$, $d_{bd}$ and $d_{cd}$, which are the shortest distances for the node pair. Here, the positioning unit 204 may model the distance between nodes using a Gaussian probability density function, and determine a weight based on the variance of the probability density function. The positioning unit 204 estimates 3D coordinates of the UWB tag 140 based on the distance d and the weight w between nodes. For example, the positioning unit 204 may estimate the location of the node using an iterative optimization technique based on a scaling by majorizing a complicated function (SMACOF) algorithm. That is, the positioning unit 204 can estimate the accurate 3D coordinates of the UWB tag 140 by minimizing the cost function S based on iterative minimization. Here, the SMA-COF algorithm used by the positioning unit 204 is known in the art, and a detailed description thereof will be omitted. The 3D coordinates of the UWB tag 140 determined by the positioning unit 204 are precise data with an error of 10 cm or less. Accordingly, the vehicle control apparatus 100 can accurately determine a relative position between the vehicle 10 and the object 14. Furthermore, the vehicle control apparatus 100 may operate as an autonomous driving assistance sensor that precisely detects a three-dimensional object position including an altitude.

The calculator 206 determines a collision risk of the vehicle 10 with the target object 14 based on the extracted dynamic information of the UWB tag 140. For example, the calculator 206 may determine a collision risk based on a relative distance between the UWB tag 140 and the vehicle 10, a moving direction of the UWB tag 140, and a relative speed of the UWB tag 140. Here, the relative distance between the UWB tag 140 and the vehicle 10 may be the distance between the UWB tag 140 and a UWB module closest thereto among a plurality of UWB modules 200. Referring to FIG. 4, the UWB modules closest to the UWB tag 140*b* and the UWB tag 140*c* are 200*c* and 200*f*, respectively. When there is no contact point between the moving direction of the UWB tag 140 and the driving path of the vehicle 10, the risk of collision between the vehicle 10 and the target object 14 may be determined to be low. When the relative distance between the UWB tag 140 and the vehicle 10 decreases with time, and it is determined that the vehicle 10 could not stop until the relative distance between the vehicle 10 and the UWB tag 140 becomes 0, the risk of collision may be determined to be very high. Meanwhile, because the vehicle control apparatus 100 may be implemented based on embedded edge portion computing, a cloud server for computation is not required. Accordingly, the vehicle control apparatus 100 may perform edge portion computing in real time using only the internal resources of the vehicle 10 without the need to transmit the tag data to a server.

Figure 5:
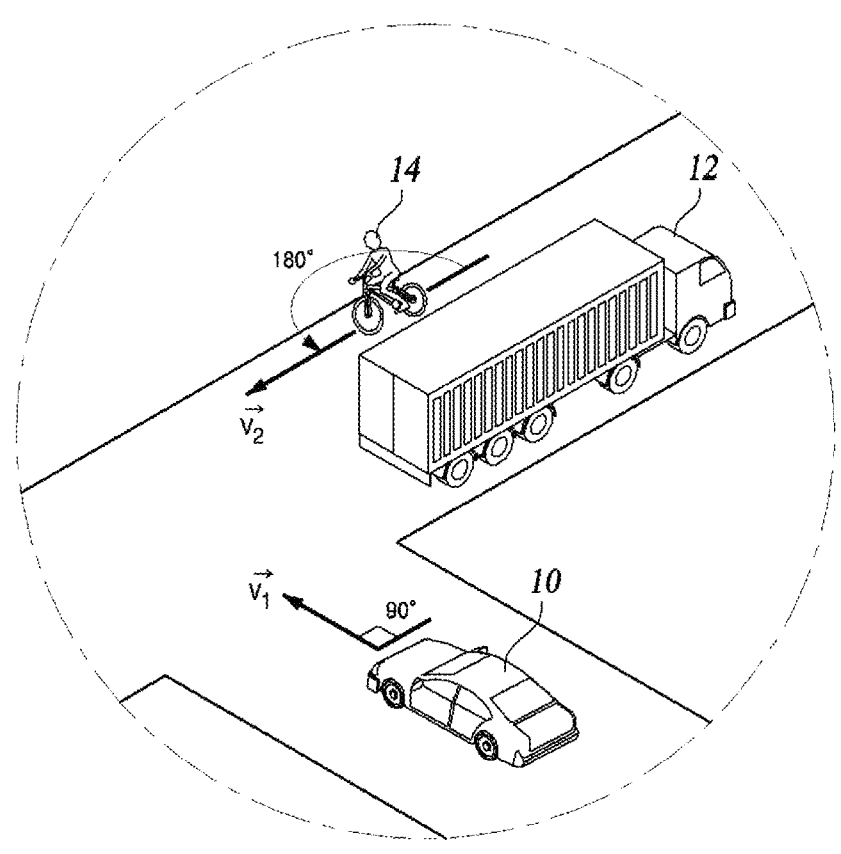
FIG. 5 is a diagram for explaining an example in which the vehicle control apparatus is configured to determine whether an object has a high collision risk.

FIG. 5 is a diagram for explaining an example in which the vehicle control apparatus is configured to determine control apparatus is configured to determine whether an object has a high collision risk.

Referring to FIG. 5, at a T junction, an object 14 existing beyond an obstacle 12 is approaching the driving path of the vehicle 10. Because the vehicle control apparatus 100 may track the moving direction and speed of the object 14 existing within the coverage of UWB communication, a second direction vector $\vec{v}_2$ indicating a direction vector of the object 14 with respect to a first direction vector $\vec{v}_1$ of the vehicle 10 may be determined. The calculator 206 determines an angle of 90 degrees between the first direction vector and the second direction vector. The calculator 206 may determine a collision risk in real time based on a relative distance of the object 14 to the vehicle 10 that decreases with time, an internal product value between the first direction vector and the second direction vector, and a direction and a scalar value of the second direction vector.

Figure 6:
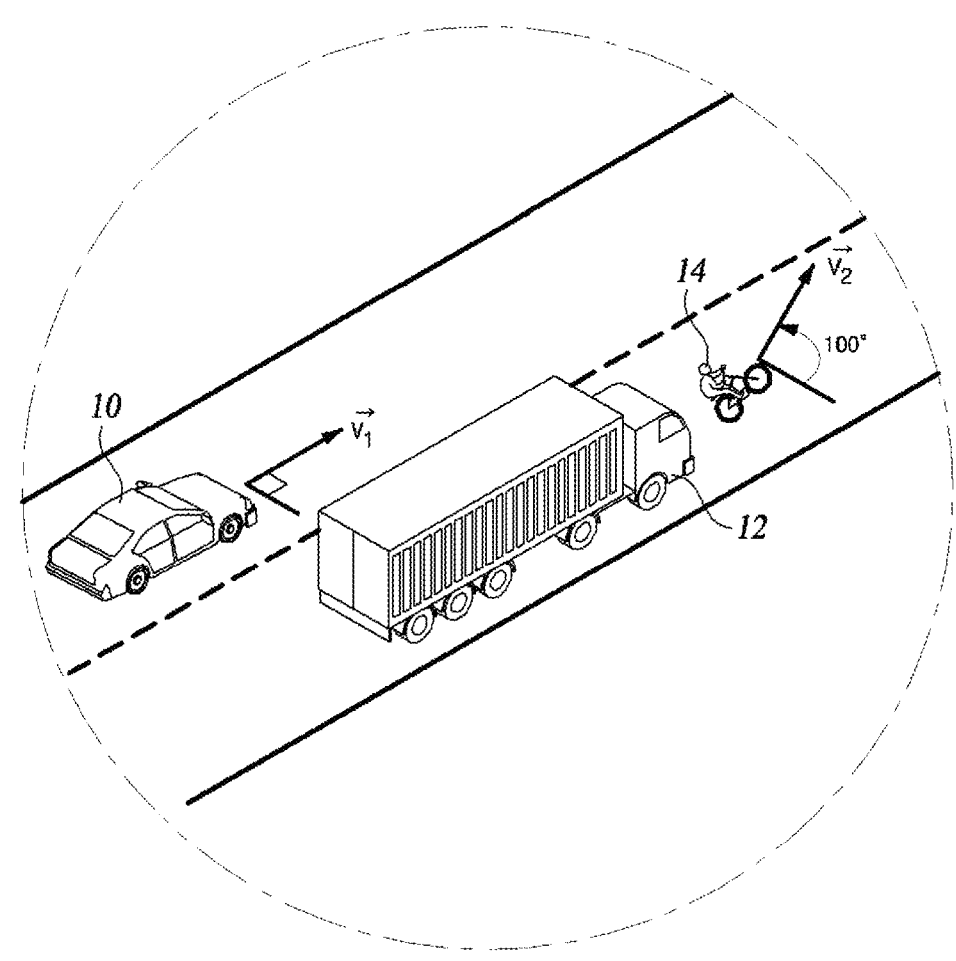
FIG. 6 is a diagram for explaining another example in which the vehicle control apparatus is configured to determine whether an object has a high collision risk.

FIG. 6 is a diagram for explaining another example in which the vehicle control apparatus is configured to determine whether an object has a high collision risk.

Referring to FIG. 6, on a straight road, an object 14 existing beyond an obstacle 12 is approaching the driving path of the vehicle 10. The calculator 206 determines an angle between the first direction vector and the second direction vector. The calculator 206 may determine a collision risk in real time based on a relative distance of the object 14 to the vehicle 10 that decreases with time, an internal product value between the first direction vector and the second direction vector, a direction and a scalar value of the second direction vector. The vehicle 10 using only the conventional LiDAR, Radar and camera cannot recognize the object 14 hidden by the obstacle 12 or the object 14 located in a blind spot. On the other hand, even when the object 14 is hidden by the obstacle 12, the vehicle control apparatus 100 according to the exemplary embodiment can recognize the object 14 having a high risk of collision with the vehicle 10 in advance based on UWB communication and avoid collision with the object 14.

In another exemplary embodiment of the present disclosure, the calculator 206 detects the target object 14 using a plurality of sensors included in the subject vehicle 10. The calculator 206 may further determine the collision risk based on the relative distance between the detected target object 14 and the subject vehicle 10. For example, the calculator 206 may detect the target object 14 existing on the driving route of the subject vehicle 10 based on sensor information collected by at least one of the LiDAR, Radar, and camera included in the subject vehicle 10. The calculator 206 may determine a collision risk between the subject vehicle 10 and the target object 14 based on the relative distance and the relative speed of the target object 14 to the subject vehicle 10. When the dynamic information of the UWB tag 140 is not available, the vehicle control apparatus 100 may control the subject vehicle 10 depending on the collision risk determined based on the sensor information. Alternatively, the vehicle control apparatus 100 may improve the accuracy of the collision risk by use of a weight determination between a first collision risk determined based on the dynamic information of the UWB tag 140 and a second collision risk determined based on the sensor information.

In various exemplary embodiments of the present disclosure, the calculator 206 inputs the input dataset generated by the pre-processor to the collision risk estimation model to estimate the collision risk between the subject vehicle 10 and the target object 14. The deep learning-based collision risk estimation model learns tag information and sensor information included in vehicle collision cases to estimate a collision risk. The vehicle control apparatus 100 may construct learning data by receiving a newly collected collision case through a wireless network such as Vehicle Ad-hoc NETwork (VANET). The vehicle control apparatus 100 may receive an updated collision risk estimation model from another vehicle or a server. The calculator 206 may improve the accuracy of the collision risk by use of a weight determination between a first collision risk, a second collision risk, and a third collision risk output by the collision risk estimation model.

The controller 208 is configured to control at least one electronic control unit (ECU) included in the subject vehicle 10 depending on the collision risk. For example, the electronic control unit includes an engine control unit, a motor driven power steering (MDPS), an electronic control suspension (ECS), a brake controller, and a display controller. The engine control unit is a device that is configured to control the operation of the engine of the vehicle 10. The controller 208 may control the engine control unit to adjust a fuel injection amount of a cylinder. When it is determined that acceleration of the vehicle 10 is necessary, the controller 208 may increase the fuel injection amount by transmitting a signal to the engine control unit. The MDPS drives a motor to provide auxiliary power for controlling the rotation direction and speed of a steering wheel. The controller 208 may control steering of the vehicle 10 by transmitting a control signal to the MDPS. The ECS is a device that is configured to control the suspension of a vehicle, and provides suspension control functions such as electronic stability control (ESC) system and traction control system (TCS). The controller 208 may transmit a control signal to the ECS to secure both ride comfort and driving safety of the vehicle 10 when the vehicle 10 is rapidly accelerated, braked, or turned to avoid collision with the target object 14. The controller 208 may transmit a control signal to the brake controller configured to control the braking system of the vehicle 10. The controller 208 may transmit a control signal to the display controller to provide driving-related information to a driver in the vehicle 10. Predetermined configurations and operating methods of the plurality of modules included in the ECU are known in the art, and further descriptions thereof will be omitted.

When the collision risk is less than a second preset probability, the controller 208 determines whether an instantaneous change rate of an estimated acceleration of the UWB tag 140 is greater than or equal to a predetermined reference change rate during a preset tracking time. Here, the collision risk less than the second probability means a case in which there is little collision risk between the vehicle 10 and the object 14. The controller 208 does not control driving of the vehicle 10 to avoid collision with the UWB tag 140 having a collision risk less than the second probability. However, because the collision risk with the corresponding UWB tag 140 may increase, the controller 208 tracks the estimated acceleration of the corresponding UWB tag 140 for a predetermined time period. That is, when the instantaneous change rate of the estimated acceleration of the UWB tag 140 increases to the reference change rate or more, the controller 208 may control driving of the vehicle 10 to avoid collision with the object 14 carrying the UWB tag 140.

When the collision risk is equal to or greater than a first preset probability, the controller 208 is configured to control a display to provide a warning notification to the driver of the subject vehicle 10. Here, the collision risk greater than or equal to the first probability means that the collision risk between the subject vehicle 10 and the object 14 is close to 100%. The controller 208 induces a sudden stop of the subject vehicle 10 by controlling the electronic control suspension and electronic brake until the subject vehicle 10 stops. The controller 208 turns off an automatic control function of the electronic power steering so that the driver of the subject vehicle 10 may control the steering of the subject vehicle 10. That is, when the collision risk is equal to or greater than the first preset probability, the controller 208 is configured to control the electronic control unit of the vehicle 10 so that the driver can avoid the collision situation by himself or herself.

Figure 7A:
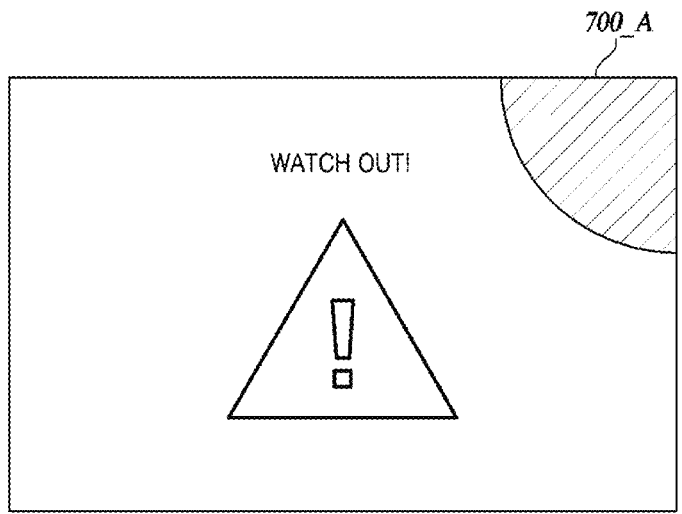
FIG. 7A and FIG. 7B are exemplary views for explaining a warning notification provided by the vehicle control apparatus according to an exemplary embodiment of the present disclosure.
Figure 7B:
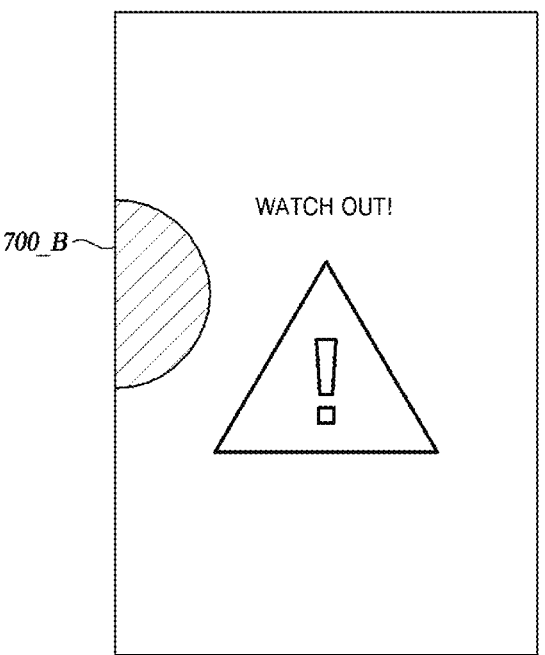

FIG. 7A and FIG. 7B are exemplary views for explaining a warning notification provided by the vehicle control apparatus according to an exemplary embodiment of the present disclosure.

Referring to FIG. 7A and FIG. 7B, a warning notification provided by the vehicle control apparatus 100 through a display is illustrated. When the vehicle control apparatus determines that the collision risk between the vehicle 10 and the object 14 is equal to or greater than the first preset probability, an area adjacent to the UWB tag 140 corresponding to the object 14 is displayed as a danger area 700 (700_A and 700_B). That is, the vehicle control apparatus 100 provides the direction from which the object 14 is approaching through the display. For example, referring to FIG. 7A, the vehicle control apparatus 100 provides a situation in which an object 14 having a very high collision risk approaches from the front right through the display. Referring to FIG. 7B, the vehicle control apparatus 100 provides a situation in which an object 14 having a very high collision risk approaches from the left side through the display. Accordingly, the driver may intuitively recognize the control direction of the steering wheel to avoid collision with the object 14 carrying the corresponding UWB tag 140.

When the collision risk is greater than or equal to the preset second probability and less than or equal to the first probability, the controller 208 determines whether it is possible to avoid collision with the target object 14. In other words, when the collision risk between the target object 14 and the subject vehicle 10 may change frequently, the controller 208 performs a secondary determination as to whether it is possible to avoid collision with the target object 14. When collision with the target object 14 is unavoidable, the controller 208 detects an object existing in an area adjacent to the target object 14 using a camera included in the subject vehicle 10. The controller 208 is configured to control the steering of the subject vehicle 10 toward a safe region, which is an area where no object is detected, in the area adjacent to the target object. That is, when a collision with the target object 14 is unavoidable, the controller 208 allows the vehicle to travel toward the safe region to avoid a secondary collision with another object. The controller 208 is configured to control the suspension and braking system of the subject vehicle 10 by controlling the electronic control suspension and the electronic brake until the subject vehicle 10 stops.

When the collision risk is greater than or equal to a preset second probability and less than or equal to the first probability and it is possible to avoid collision with the target object, the controller 208 is configured to control at least one of an engine control unit, the electronic power steering, the electronic control suspension, the electronic brake, and the display. When the controller 208 determines that the vehicle 10 can travel along the same driving route after avoiding collision with the target object 14, the controller 208 transmits a control signal to the engine control unit, the brake controller, and the MDPS to allow the vehicle 10 to travel without stopping. The controller 208 is configured to control driving of the vehicle 10 in various scenarios based on the collision risk. Accordingly, the vehicle control apparatus 100 can avoid collision with the object 14 carrying the UWB tag 140 in advance before the collision risk is determined by the Radar, LiDAR, or camera.

Figure 8:
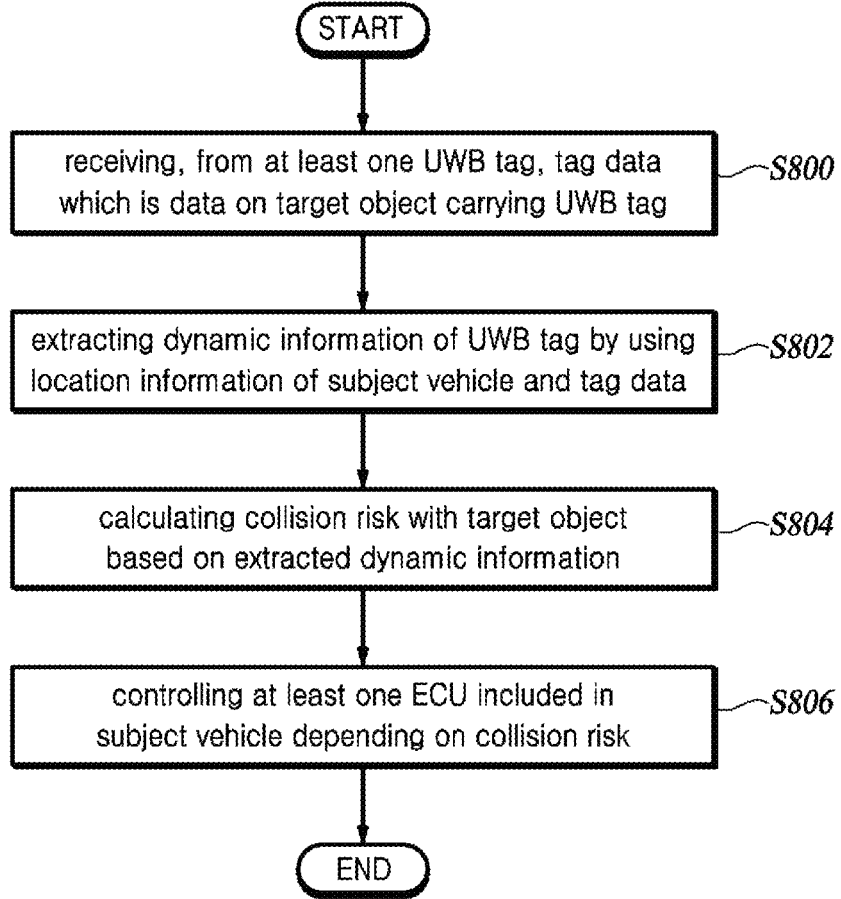
FIG. 8 is a flowchart illustrating processes included in a vehicle control method according to an exemplary embodiment of the present disclosure.

FIG. 8 is a flowchart illustrating processes included in a vehicle control method according to an exemplary embodiment of the present disclosure.

The vehicle control apparatus 100 receives, from at least one UWB tag 140, tag data, which is data about the target object 14 carrying the corresponding UWB tag 140 (S800).

The vehicle control apparatus 100 extracts dynamic information of the UWB tag 140 using location information of the subject vehicle 10 and the tag data (S802).

The vehicle control apparatus 100 determines a collision risk with respect to the target object 14 based on the extracted dynamic information (S804).

The vehicle control apparatus 100 is configured to control at least one electronic control unit (ECU) included in the subject vehicle 10 depending on the collision risk (S806).

Figure 9:
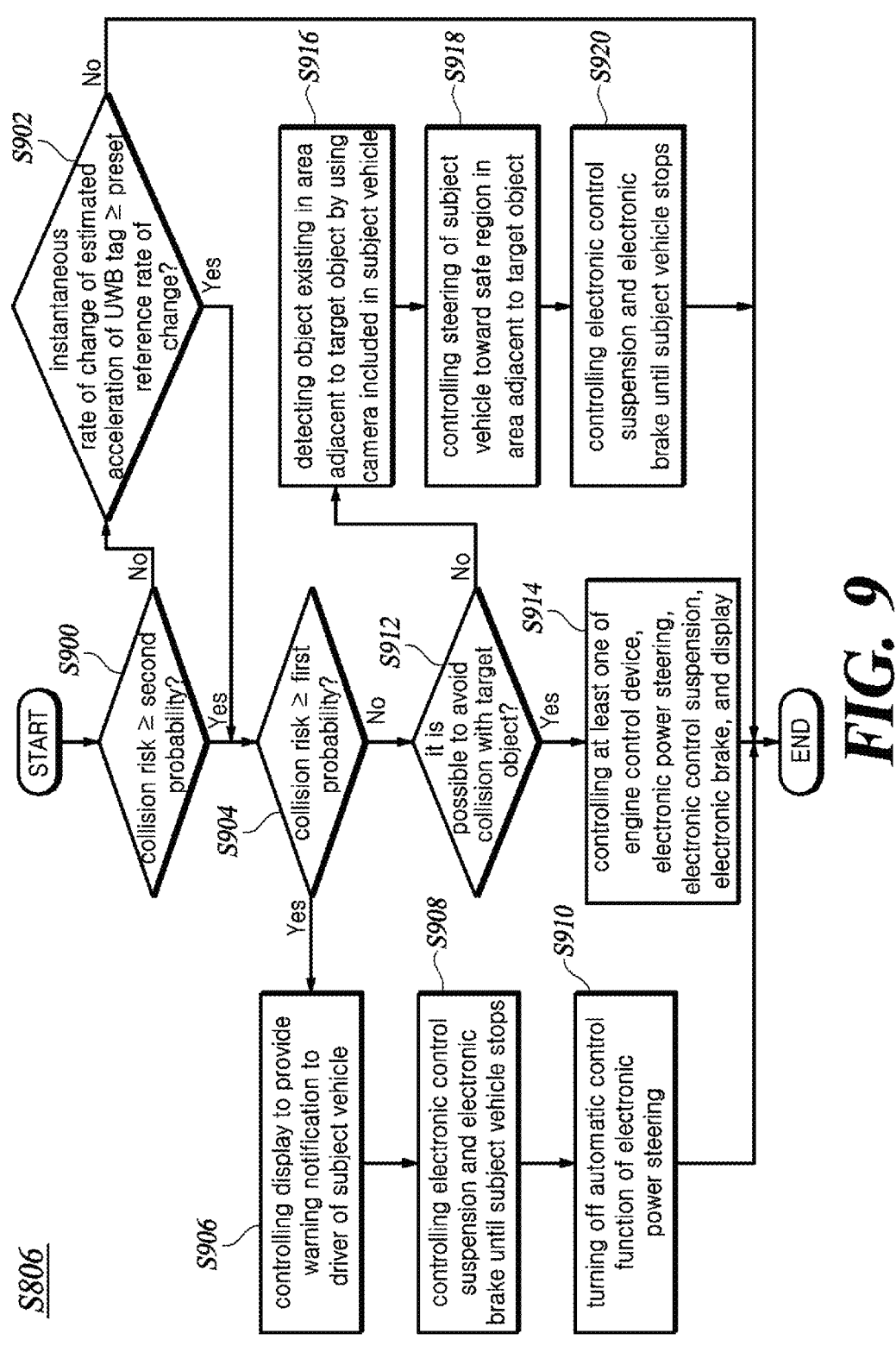
FIG. 9 is a flowchart for explaining processes included in a method in which the vehicle control apparatus according to an exemplary embodiment of the present disclosure is configured to control a vehicle depending on a degree of collision risk.

FIG. 9 is a flowchart for explaining each process included in a method in which the vehicle control apparatus according to an exemplary embodiment of the present disclosure is configured to control a vehicle depending on a degree of collision risk.

The vehicle control apparatus 100 determines whether the collision risk is equal to or greater than the second probability (S900). When the collision risk between the vehicle 10 and the object 14 is less than the second probability, the vehicle control apparatus 100 determines whether the instantaneous change rate of the estimated acceleration of the UWB tag 140 is equal to or greater than the predetermined reference change rate (S902).

When the collision risk between the vehicle 10 and the object 14 is equal to or greater than the second probability, the vehicle control apparatus 100 determines whether the collision risk is equal to or greater than the first probability (S904). When the collision risk between the vehicle 10 and the object 14 is equal to or greater than the first probability, the vehicle control apparatus 100 is configured to control the display to provide a warning notification to the driver of the subject vehicle 10 (S906). The vehicle control apparatus 100 is configured to control the electronic control suspension and the electronic brake until the subject vehicle 10 stops (S908). The vehicle control apparatus 100 turns off the automatic control function of the electronic power steering (S910).

When the collision risk between the vehicle 10 and the object 14 is less than the first probability, the vehicle control apparatus 100 determines whether it is possible to avoid collision with the target object 14 (S912). When the vehicle control apparatus 100 determines that the vehicle 10 can avoid collision with the target object 14, the vehicle control apparatus 100 is configured to control at least one of the engine control unit, the electronic power steering, the electronic control suspension, the electronic brake, and the display (S914).

When vehicle control apparatus 100 determines that a collision with the target object 14 is unavoidable, the vehicle control apparatus 100 detects an object existing in an area adjacent to the target object 14 by use of the camera included in the subject vehicle 10 (S916). The vehicle control apparatus 100 is configured to control the steering of the subject vehicle 10 toward a safe area among areas adjacent to the target object 14 (S918). The vehicle control apparatus 100 is configured to control the electronic control suspension and the electronic brake until the subject vehicle 10 stops (S920).

Figure 10:
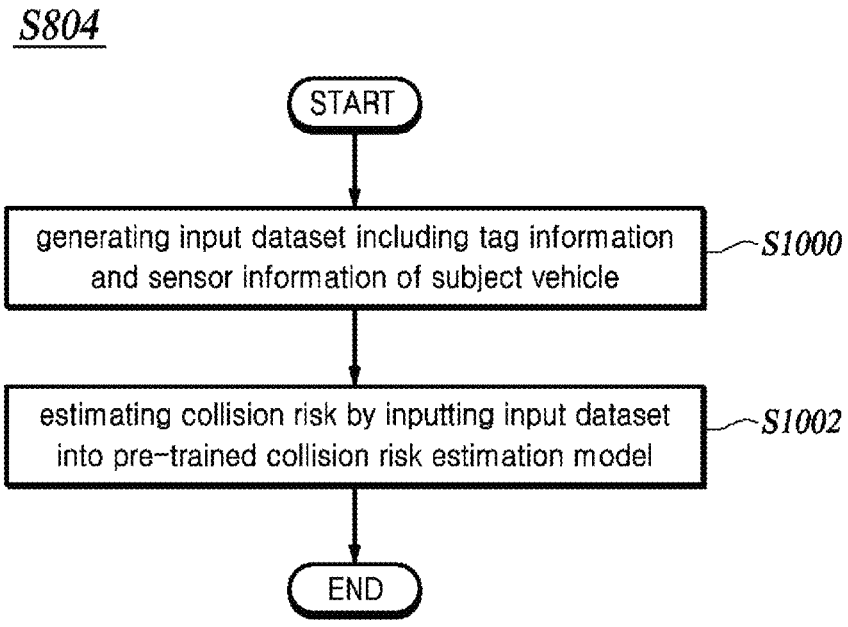
FIG. 10 is a flowchart illustrating processes included in a method for estimating a collision risk by the vehicle control apparatus according to an exemplary embodiment of the present disclosure.

FIG. 10 is a flowchart illustrating each process included in a method for estimating a collision risk through the vehicle control apparatus according to an exemplary embodiment of the present disclosure.

The vehicle control apparatus 100 generates an input dataset including tag information and sensor information of the subject vehicle 10 (S1000).

The vehicle control apparatus 100 estimates a collision risk by inputting the input dataset into the pre-trained collision risk estimation model (S1002). The vehicle control apparatus 100 may transmit the generated input dataset and the estimated collision risk for the input dataset to another vehicle or a server through a network such as VANET. The another vehicle or the server may update the collision risk estimation model by learning the input dataset and the collision risk.

Although it is described that the processes are sequentially executed in the flowcharts, this is merely illustrative of the technical idea of various exemplary embodiments of the present disclosure. In other words, because an ordinary skilled person in the art to which the exemplary embodiments of the present disclosure pertain may make various modifications and changes by changing the order of the processes described in the flowchart or performing one or more of the processes in parallel without departing from the essential characteristics of the exemplary embodiments of the present disclosure, the flowcharts are not limited to a time-series order.

Various implementations of the systems, the devices and the methods described herein may be realized by a digital electronic circuit, an integrated circuit, a field programmable gate array (FPGA), an application specific integrated circuit (ASIC), computer hardware, firmware, software, and/or a combination thereof. These various implementations may include an implementation by one or more computer programs executable on a programmable system. The programmable system includes at least one programmable processor (which may be a special purpose processor or a general-purpose processor) coupled to a storage system, at least one input device, and at least one output device to receive and transmit data and instructions therefrom and thereto. Computer programs (also known as programs, software, software applications or codes) include instructions for the programmable processor and are stored in a "computer-readable recording medium".

The computer-readable recording medium includes all types of recording devices in which data readable by a computer system is stored. The computer-readable recording medium may include non-volatile or non-transitory mediums such as ROM, CD-ROM, a magnetic tape, a floppy disk, a memory card, a hard disk, an optical disk, and a storage device, and may further include a temporary medium such as a data transmission medium. Furthermore, the computer-readable recording medium may be distributed in a network-connected computer system, and computer-readable codes may be stored and executed in a distributed manner.

Various implementations of the systems, the devices and the methods described herein may be implemented by a programmable computer. Here, the computer includes a programmable processor, a data storage system (including a volatile memory, a nonvolatile memory, or another type of storage system or a combination thereof), and at least one communication interface. For example, a programmable computer may be one of a server, a network device, a set-top box, a built-in device, a computer expansion module, a personal computer, a laptop, a personal data assistant (PDA), a cloud computing system, and a mobile device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling a vehicle based on ultra-wideband (UWB) performed by a vehicle control apparatus, the method comprising:

receiving from at least one UWB tag, tag data which is data about a target object carrying the at least one UWB tag;

extracting dynamic information of the at least one UWB tag using location information of a subject vehicle and the tag data;

determining a collision risk of the subject vehicle with the target object based on the extracted dynamic information; and controlling at least one electronic control unit (ECU) included in the subject vehicle based on comparing the collision risk with a preset first probability and a preset second probability, wherein the controlling includes determining whether collision of the subject vehicle with the target object is avoidable when the collision risk is greater than or equal to the preset second probability and less than or equal to the preset first probability, wherein the extracting includes:

searching for shortest paths between pairs of nodes on a data structure having recognized UWB tags and a plurality of UWB modules of the subject vehicle as nodes;

determining weights for distances between the nodes corresponding to the shortest paths; and estimating 3D coordinates of the at least one UWB tag based on the distances between the nodes and the weights, wherein the plurality of UWB modules are adjacent to the recognized UWB tags, and wherein the pairs of nodes are determined as pairs corresponding to shortest paths between the recognized UWB tags and the plurality of UWB modules, and between the plurality of UWB modules.

2. The method of claim 1, wherein the controlling includes:

determining whether an instantaneous change rate of estimated acceleration of the at least one UWB tag during a preset tracking time is equal to or greater than a predetermined reference change rate when the collision risk is less than the preset second probability.

3. The method of claim 1, wherein the controlling includes:

controlling a display to provide a warning notification to a driver of the subject vehicle when the collision risk is greater than or equal to the preset first probability;

controlling an electronic control suspension and an electronic brake until the subject vehicle stops; and turning off an automatic control function of an electronic power steering.

4. The method of claim 3, wherein the determining the collision risk of the subject vehicle further includes:

detecting the target object using a plurality of sensors included in the subject vehicle; and determining the collision risk based on a distance between the subject vehicle and the target object.

5. The method of claim 1, wherein, when the collision with the target object is unavoidable, the controlling includes:

detecting an object existing in an area adjacent to the target object using a camera included in the subject vehicle;

controlling steering of the subject vehicle toward a safe area in which no object is detected in the area adjacent to the target object; and controlling an electronic control suspension and an electronic brake until the subject vehicle stops.

6. The method of claim 1, wherein when the collision with the target object is avoidable, the controlling includes:

controlling at least one of an engine control unit, an electronic power steering, an electronic control suspension, an electronic brake, or a display.

7. The method of claim 1, further including:

generating an input dataset including tag information and sensor information of the subject vehicle; and estimating the collision risk by inputting the input dataset into a pre-trained collision risk estimation model.

8. A non-transitory computer-readable storage medium storing instructions that, when executed by a processor, configure the processor to perform the method of claim 1.

9. An apparatus for controlling a vehicle based on ultra-wideband (UWB), the apparatus comprising:

a memory; and a plurality of processors, wherein at least one processor of the plurality of processors is configured to:

receive, from at least one UWB tag, tag data which is data about a target object carrying the at least one UWB tag;

extract dynamic information of the at least one UWB tag using location information of a subject vehicle and the tag data;

determine a collision risk of the subject vehicle with the target object based on the extracted dynamic information; and control at least one electronic control unit (ECU) included in the subject vehicle based on comparing the collision risk with a preset first probability and a preset second probability, wherein the at least one processor is further configured to determine whether collision of the subject vehicle with the target object is avoidable when the collision risk is greater than or equal to the preset second probability and less than or equal to the preset first probability, wherein the at least one processor is further configured to:

search for shortest paths between pairs of nodes on a data structure having recognized UWB tags and a plurality of UWB modules of the subject vehicle as nodes;

determine weights for distances between the nodes corresponding to the shortest paths; and estimate 3D coordinates of the at least one UWB tag based on the distances between the nodes and the weights, wherein the plurality of UWB modules are adjacent to the recognized UWB tags, and wherein the pairs of nodes are determined as pairs corresponding to shortest paths between the recognized UWB tags and the plurality of UWB modules, and between the plurality of UWB modules.

10. The apparatus of claim 9, wherein the at least one processor is further configured to:

determine whether an instantaneous change rate of estimated acceleration of the at least one UWB tag during a preset tracking time is equal to or greater than a predetermined reference change rate when the collision risk is less than the preset second probability.

11. The apparatus of claim 9, wherein the at least one processor is further configured to:

control a display to provide a warning notification to a driver of the subject vehicle when the collision risk is greater than or equal to the preset first probability;

control an electronic control suspension and an electronic brake until the subject vehicle stops; and turn off an automatic control function of an electronic power steering.

12. The apparatus of claim 11, wherein at least one processor is further configured to:

detect the target object using a plurality of sensors included in the subject vehicle; and determine the collision risk based on a distance between the subject vehicle and the target object.

13. The apparatus of claim 9, wherein, when the collision with the target object is unavoidable, the at least one processor is further configured to:

detect an object existing in an area adjacent to the target object using a camera included in the subject vehicle;

control steering of the subject vehicle toward a safe area in which no object is detected in the area adjacent to the target object; and control an electronic control suspension and an electronic brake until the subject vehicle stops.

14. The apparatus of claim 9, wherein when the collision with the target object is avoidable, the at least one processor is further configured to:

control at least one of an engine control unit, an electronic power steering, an electronic control suspension, an electronic brake, or a display.

15. The apparatus of claim 9, wherein the at least one processor is further configured to:

generate an input dataset including tag information and sensor information of the subject vehicle; and estimate the collision risk by inputting the input dataset into a pre-trained collision risk estimation model.

* * * * *